US009814635B2

(12) United States Patent
Bruns

(10) Patent No.: US 9,814,635 B2
(45) Date of Patent: Nov. 14, 2017

(54) VEHICLE LIFT

(75) Inventor: Gerit Bruns, Bad Zwischenahn (DE)

(73) Assignee: AMF-Bruns GmbH & Co. KG, Apen (DE)

( * ) Notice: Subject to any disclaimer, the term of this patent is extended or adjusted under 35 U.S.C. 154(b) by 650 days.

(21) Appl. No.: 13/538,060

(22) Filed: Jun. 29, 2012

(65) Prior Publication Data

US 2013/0251488 A1 Sep. 26, 2013

(30) Foreign Application Priority Data

Mar. 21, 2012 (DE) .................... 20 2012 002 833 U

(51) Int. Cl.
*B60P 1/44* (2006.01)
*A61G 3/06* (2006.01)

(52) U.S. Cl.
CPC ........... *A61G 3/062* (2013.01); *Y10S 414/134* (2013.01)

(58) Field of Classification Search
CPC ........... A61G 3/06; B60P 1/483; B65G 60/00; B65G 1/00; B66F 7/0641; Y10S 414/134
USPC .................................................. 414/546, 921
See application file for complete search history.

(56) References Cited

U.S. PATENT DOCUMENTS 3,613,917 A * 10/1971 Fowler, Jr. ............... A61G 3/06 414/540
3,807,592 A * 4/1974 Lynn .................... A61G 3/0209 414/462
4,087,007 A * 5/1978 Drews ................... B60P 1/4421 414/545
4,198,188 A * 4/1980 Perkins ................. B60P 1/4457 414/545
4,399,570 A * 8/1983 Tracy ................... A61G 7/1005 114/362
4,534,450 A 8/1985 Savaria
4,604,022 A 8/1986 Bourgraf
5,230,522 A 7/1993 Gehlsen et al.
(Continued)

FOREIGN PATENT DOCUMENTS

DE 33 32 974 C1 4/1985
DE 34 38 079 A1 10/1985
(Continued)

OTHER PUBLICATIONS

Bending of Extruded Profiles during Extrusion Process, K. B. Muller, Materials Forum vol. 28, 2004.*
(Continued)

*Primary Examiner* — Gene Crawford
*Assistant Examiner* — Mark Hageman
(74) *Attorney, Agent, or Firm* — Wood Herron & Evans LLP

(57) ABSTRACT

A vehicle lift for a load, such as a wheelchair. The whole lift is movable between a retracted position and an extended position that comprises a support pillar, a platform, and a lifting device. The platform is connected pivotably to the support pillar and has a horizontal pivot axis such that the platform is pivotable about the horizontal axis. The lifting device is hingedly connected to the support pillar and is configured for lifting and lowering the support pillar with the platform between the retracted position and the extended position. The support pillar is one piece and has a curved configuration along the longitudinal axis.

20 Claims, 8 Drawing Sheets

(56) References Cited

U.S. PATENT DOCUMENTS

| | | | | | |
|---|---|---|---|---|---|
| 5,234,311 | A * | 8/1993 | Loduha, Jr. | A61G 3/06 | 414/546 |
| 6,379,102 | B1 | 4/2002 | Kameda | | |
| 6,464,447 | B2 | 10/2002 | Dupuy et al. | | |
| 6,585,474 | B1 * | 7/2003 | Kameda | A61G 3/06 | 414/546 |
| 6,595,738 | B2 * | 7/2003 | Rock | B60P 1/4428 | 187/222 |
| 7,527,467 | B2 * | 5/2009 | Edwards et al. | 414/537 | |
| 2003/0095856 | A1 * | 5/2003 | Ablabutyan et al. | 414/546 | |
| 2007/0224025 | A1 * | 9/2007 | Ablabutyan | B60P 1/4442 | 414/546 |
| 2009/0010744 | A1 * | 1/2009 | Sobota | A61G 3/06 | 414/546 |

FOREIGN PATENT DOCUMENTS

| | | | |
|---|---|---|---|
| DE | 20318186 | U1 | 7/2004 |
| DE | 20309868 | U1 | 11/2004 |
| DE | 699 33 332 | T2 | 5/2007 |
| DE | 699 36 644 | T2 | 4/2008 |
| JP | 2003-341408 | A | 12/2003 |

OTHER PUBLICATIONS

Dr. Alf Harnisch; Search Report issued in German Application No. 20 2012 002 833.2; dated Nov. 7, 2012; 5 pages; German Patent Office.

European Patent Office, Search Report issued in European patent application No. EP 13 16 0454 dated Jun. 14, 2013.

European Patent Office, Official Action issued in application No. 13 160 454.8 dated Apr. 28, 2014.

* cited by examiner

VEHICLE LIFT

TECHNICAL FIELD

The invention concerns a vehicle lift for loads, in particular wheelchairs, and a production process for the production of the lifting device.

BACKGROUND

Vehicle lifts fitted to vehicles have long been known. They serve to convey articles or people from the interior of the vehicle to the exterior and back again if there is a difference in level between the level of the interior of the vehicle and the location at which the articles or people are to be placed, or if there is a gap which has to be bridged over. An important application for such vehicle lifts is in vehicles in which wheelchair users are transported. Such a vehicle lift of the general kind set forth, to the present applicant, is disclosed for example in DE 203 09 868 U1.

Known vehicle lifts have a platform which is pivoted movably to at least one support pillar and is moved by means of a lifting device. In general a distinction can be drawn between at least two main positions. The first retracted position is the retracted position, during which the vehicle lift is not used. The platform is then generally in a vertical position so that the entire vehicle lift takes up as little room and space as possible and does not interfere while travelling with the vehicle.

In the second extended position, the vehicle lift is extended and the platform is disposed substantially horizontally near the ground so that, for example, a wheelchair user can easily go from the ground on to the platform. In most cases, there is also an intermediate position in which the platform is approximately at the level of a vehicle interior so that, for example, a wheelchair user can travel from the platform into the vehicle interior. Between the intermediate position and the second extended position the platform is lowered substantially parallel to itself by means of the lifting device.

Particular significance is attributed to the support pillar of such a vehicle lift. First, it is connected on the one hand to the lifting device which causes the movement of the platform and, on the other hand, the platform is pivotably mounted to the support pillar. Consequently, all forces and moments from the platform are transmitted to the vehicle by way of the support pillar. Therefore, such a support pillar on the one hand must bear and withstand such forces while on the other hand the support pillar must be so designed that the vehicle lift can be arranged in the vehicle in a condition of occupying as little space as possible, in the first retracted position. In addition, the support pillar should be light to avoid unnecessary additional weight due to the vehicle lift. Previous support pillars for that purpose generally comprise a steel carrier having a multiplicity of weld seams so that it is put into the shape of the support pillar. Weld seams have a number of disadvantages. On the one hand, a welded seam always signifies one or more additional working steps such as cutting, preparation, welding, cleaning and so forth. On the other hand, weld seams in dynamically and alternatingly loaded components generally represent particular weak points.

Therefore the object of the present invention is to provide a vehicle lift, a support pillar and a production process which are at least partially improved in respect of the above-mentioned problems.

SUMMARY

According to the invention, a vehicle lift may include at least one lifting device which can be moved at least into a first retracted position and a second extended position. The vehicle lift comprises at least one support pillar, a platform pivoted movably to the at least one support pillar, and at least one lifting device hingedly connected to the support pillar for lifting and lowering the support pillar together with the platform. The at least one support pillar is in one piece and is of a curved configuration at least portion-wise along its longitudinal axis.

In accordance with the invention, an advantage is that no weld seams or other joining process steps are required. The at least one support pillar is formed entirely in one piece. As a result, on the one hand, production is substantially simplified while, on the other hand, critical joint locations are eliminated, whereby the service life, and also the safety and reliability, of the vehicle lift is improved. Because the at least one support pillar has a curved configuration at least portion-wise along its longitudinal axis, the support pillar can better co-operate with the lifting device for carrying and transmitting forces and moments. In addition, because of the curved portion of the at least one support pillar, the vehicle lift can be disposed in the first retracted position in vehicles in such a way as to save more space.

Because the at least one support pillar is in one piece, it can also turn out to be lighter in weight than conventional support pillars. Particularly, if there are weld seams, a certain thickness of material has to be present for the weld seams. In a vehicle lift according to the invention having the one-piece support pillar, it is possible to optimize its weight. In addition, the visual impression of the support pillar and, thus, the entire vehicle lift is also substantially improved by the gently curved, pleasing and sporty impression caused by the integrally curved structure.

In that respect, the at least one support pillar is preferably substantially kink-free. The curved portion of the support pillar can, for example, occupy only a part of the support pillar. In an alternative, the support pillar is of a curved configuration throughout. In that respect, according to the invention, the support pillar is of a curved configuration along its longitudinal axis. In other words, the longitudinal axis is curved at least portion-wise. In particular, there are preferably two support pillars in the vehicle lift.

In a first preferred embodiment, the support pillar comprises aluminum. Preferably, the support pillar is in the form of an aluminum extrusion profile member. Preferably, the aluminum support pillar is anodized. The fact that the support pillar comprises aluminum means that the weight of the vehicle lift is substantially reduced. That is highly advantageous as in that way thereby the remaining working load of a vehicle in which the vehicle lift is installed is increased while, on the other hand, a vehicle having such a vehicle lift can be operated with less energy consumption. If the support pillar is additionally in the form of an aluminum extrusion profile member, production is also simplified. Such a profile member can, for example, be produced endlessly and corresponding support pillars can then be cut to length, whereupon then the curved portion is produced in the support pillar. Thereby, the production costs are additionally reduced.

Preferably, the support pillar is of a curved configuration in an upper portion. The term ‘upper’ refers here to a usual installation situation for the vehicle lift. Preferably, the support pillar is hingedly connected to the lifting device, in the upper portion. Because the support pillar is of a curved configuration in that upper portion, the co-operation with the lifting device is improved. Accordingly, a lower portion can be, for example, of a substantially straight configuration. Because the lower portion of the support pillar is substantially straight, the platform can be held near to the vehicle in the second extended position. That is advantageous in terms of the safety of the vehicle lift.

In a further preferred embodiment, the support pillar is in the form of a profile member and, in particular, has a substantially U-shaped configuration in a cross-section. Because the support pillar is in the form of a profile member, in particular, a U-shaped profile member, on the one hand the stiffness of the support pillar is increased so that forces and moments can be better transmitted. On the other hand, a profile member shape, in particular a substantially U-shaped profile member, can be produced simply in an easy fashion, for example, by means of extrusion, so that production of the support pillar is also more easily possible.

Preferably, the curved portion of the support pillar has a bending radius of between 700 mm and 1000 mm, preferably about 820 mm. Those details relate to an inside radius measured at an inner edge of the support pillar. With such bending radii, particularly good application of forces is achieved; in particular, if pivotal mounting points of the lifting device to the support pillar are arranged on a circular path concentrically with the radius described by the curved portion. In addition, the visual impression of the vehicle lift is further improved in that way.

In a preferred embodiment, the platform is attached to the support pillar pivotably about a horizontal pivot axis and the lifting device is adapted for moving the support pillar together with the platform perpendicularly to the pivot axis. That is advantageous, on the one hand, to permit operation in as space-saving relationship as possible, as is necessary in narrow streets and parking situations of a vehicle fitted with the lift while, on the other hand, that simplifies construction so that production of the vehicle lift is simpler and the weight thereof can also be reduced.

Preferably, the lifting device has a parallelogram linkage having at least two support arms, which are arranged in substantially mutually parallel relationship and which are respectively pivoted with one end to the support pillar and with the other end to a vehicle-side fixing portion, wherein the support arms are preferably in the form of aluminum profile members. Such a parallelogram linkage is known in principle, for example, also from above-mentioned DE-203 09 868 U1 and can advantageously be used for moving the vehicle lift. If there are two support pillars, there are preferably also two parallelogram linkages.

Because the support arms are formed from aluminum profile members, on the one hand, production is simplified, for example, such that it is possible by means of extrusion, rolling or also deep drawing. On the other hand, the weight of the vehicle lift is also further reduced. As an alternative to the parallelogram linkage, it would also be possible to use other lifting devices such as, for example, purely hydraulic, pneumatic, electric or also other mechanical lifting devices such as, for example, various pull cable arrangements and the like.

Preferably, at least one passage for passing lines therethrough is formed on the support arms, preferably at an inside of the profile member. Such a passage is preferably already formed on the support arms in production, for example, in the extrusion process. Cables, which are necessary for example for motors, lighting means, and/or an operating device on the vehicle lift, can be passed through that passage. Those cables are on the one hand held stationary by the passage, while on the other hand they are also protected from damage to improve safety and reliability. In addition, the visual impression is also improved as no cables have to be visibly passed along an outside surface.

In accordance with one of the preferred embodiments, at least one support for supporting moments in relation to the support pillar is arranged on the platform. Moments caused by loads on the platform about the hinged connection between the platform and the support pillar have to be supported. For that purpose, the support is preferably fixedly mounted to the platform and has a contact portion with which it contact the support pillar in order to support moments in relation thereto. The support is preferably in the form of a free-form part and/or casting in which the weight of the vehicle lift further reduced.

Preferably the support is provided to limit a pivotal movement of the platform relative to the support pillar by an abutment on the support coming into contact with the support pillar. For instance, pivotal movement will be limited wherein the application of force to the support pillar takes place in a central portion of the support pillar, preferably substantially centrally with respect to a direction perpendicular to the longitudinal axis of the support pillar. Preferably, the application of force occurs in the region of a back of the support pillar which is substantially U-shaped in cross-section and, preferably, between the two legs of the U-shaped support pillar and not at one of the legs. Application of force to the central region of the support pillar, with respect to a direction perpendicular to a longitudinal axis, preferably substantially in a horizontal center of the support pillar avoids twisting of the support pillar. The abutment on the support is preferably provided on a projection extending in an arm shape from the platform in the direction of the support pillar. Thus, the application of forces at the center of the support pillar is advantageously possible.

It is further preferred for a reinforcing profile member to be arranged on the support pillar for co-operating with the abutment on the support. That is particularly advantageous if the support pillar is made from aluminum. However, aluminum is a lightweight material of low density. Because of those properties, impact and abrasion loadings can lead to more rapid wear under some circumstances. Therefore, the reinforcing profile member is preferably arranged on the support pillar to protect the material. The reinforcing profile member can be arranged internally for example in the U-shaped region of the support pillar. Preferably, the reinforcing profile member is joined to the support pillar by means of a screw connection. The reinforcing profile member is preferably provided in the form of a wearing component. Thus, in a wear situation, only the reinforcing profile member has to be replaced while the support pillar remains intact. As a result on the one hand costs are reduced while on the other hand repair or maintenance of the vehicle lift is simplified. The reinforcing profile member preferably comprises aluminum. Alternatively, the reinforcing profile member comprises another metal or plastic material.

It is further preferred to provide a mechanism for pivoting the platform, the mechanism engaging the support and/or the platform. The mechanism is intended to pivot the platform from the first retracted position in which the platform is oriented, substantially vertically, into the horizontal, in which the platform is arranged in the second extended position. Consequently, the lifting device is provided for lifting and lowering the platform and the mechanism is provided only for pivoting the platform.

Preferably, the mechanism for pivoting the platform has an elbow lever having a first leg and a second leg connected thereto in an elbow-hinged relationship wherein the first leg is pivoted to the support pillar and the second leg is pivoted to the support. Such an elbow lever is a particularly simple way of pivoting the platform. For example, when moving the vehicle lift from the first to the second extended position, the elbow joint, on which there is preferably provided a slide shoe, can come into contact with one of the support arms of the parallelogram linkage to pivot the platform.

Particularly preferably, the second leg is in the form of a thrust rod, wherein joint elements are arranged at both ends adjustably relative to the thrust rod. By way of example, the joint elements, are connected to the thrust rod by means of opposite-pitch threads wherein the first joint element forms a part of the elbow joint and the second joint element is pivoted to the platform and/or to the support. Thus, the two joint elements are movable, towards and away from each other, for example, by means of rotation of the thrust rod. Thus the two joint elements adjustable relative to each other make it possible to adjust a pivotal angle of the platform upon movement from the first retracted position into the second extended position. Depending on the respective type of vehicle and the installation situation, that angle of installation can vary so it is advantageous for that pivotal angle to be adjustable in a simple fashion.

In a further preferred embodiment, two side plates are arranged on the platform, which each have a respective stamping. Side plates serve on the one hand for laterally guiding wheelchairs travelling, for example, on to the platform, which enhances the safety aspect of the vehicle lift. On the other hand, the side plates also serve to stabilize the platform so that it does not flex under load. For that purpose, the side plates are preferably arranged substantially perpendicularly to the plane formed by the platform. By stampings being provided in the side plates, the stiffness of the latter is increased so that the side plates and the platform itself can be made with smaller material thicknesses, thereby reducing the weight of the vehicle lift. The stamping is preferably formed along a longitudinal axis of the side plates.

In a further aspect of the invention wherein the support pillar is in the form of a one-piece curved aluminum profile member.

In a further aspect of the embodiment, of the invention a production process is described for a support pillar for use in a vehicle lift. The process includes the steps: extrusion, in particular aluminum extrusion, of a substantially U-shaped profile member, and bending of the profile member at least portion-wise along its longitudinal axis.

It is to be understood that the support pillar, according to the production process, and the vehicle lift have similar and identical preferred developments and advantages.

BRIEF DESCRIPTION OF THE DRAWINGS

The invention is described in greater detail hereinafter by means of an embodiment by way of example with reference to the accompanying Figures in which.

DETAILED DESCRIPTION

Figure 1:
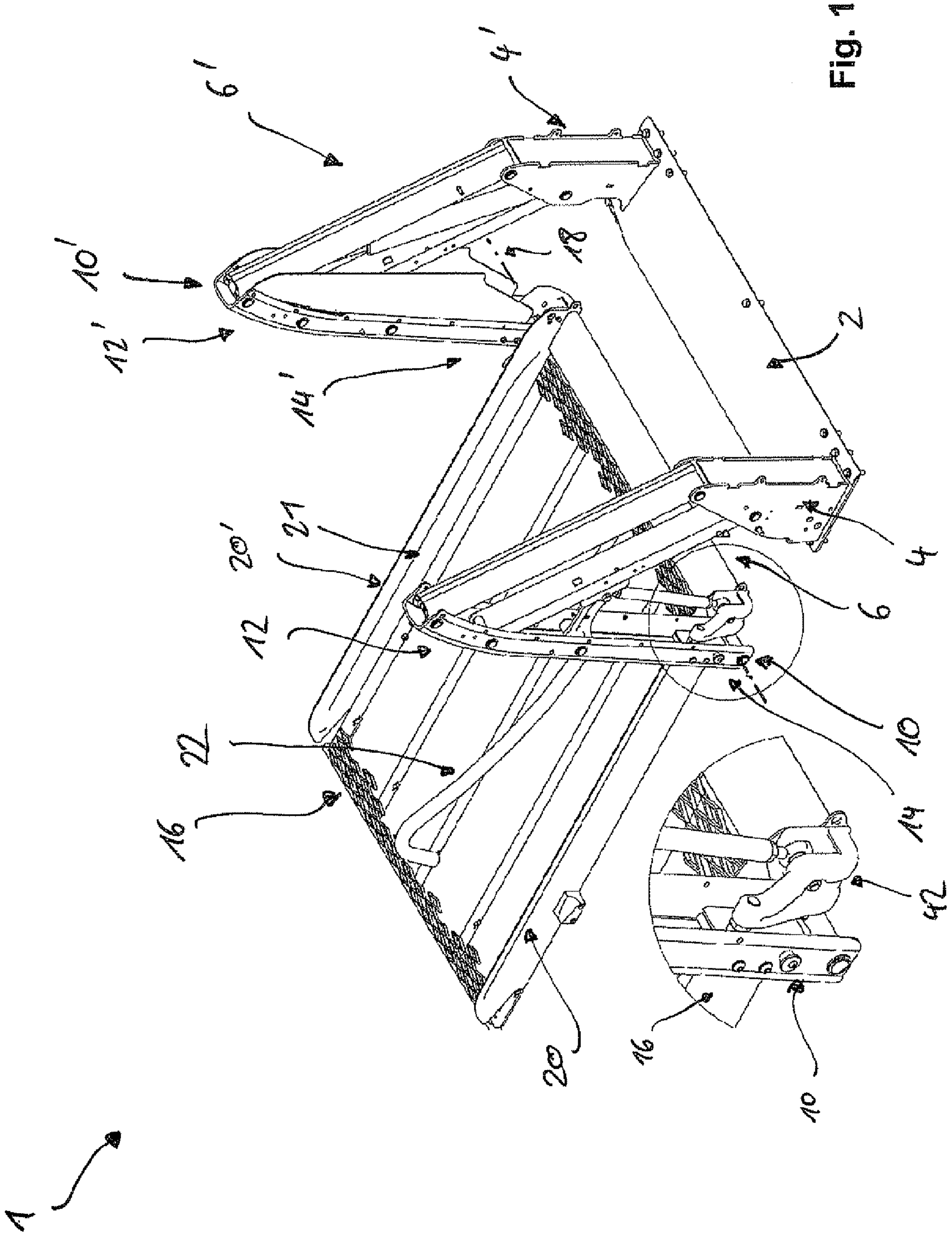
FIG. 1 is a perspective view of a vehicle lift in the intermediate position.

FIG. 1 shows a perspective view of a vehicle lift 1 in a position referred to as the intermediate position. Two stands 4, 4', which are of mirror-symmetrical relationship to each other, are fixed on a bottom plate 2. The bottom plate 2 and the stands 4, 4' together form a holding portion at the vehicle side. Arranged on the stands 4, 4' are a respective lifting devices 6, 6' which in this embodiment is in the form of a parallelogram linkage. Arranged on the lifting devices 6, 6' (which are described in greater detail hereinafter) at the end opposite to the stands 4, 4' are respective support pillars 10, 10'. The support pillars 10, 10' (see also FIG. 6) have upper portions 12, 12' and lower ends or portions 14, 14'. The support pillars 10, 10' are connected to the lifting devices 6, 6' with the upper portions 12, 12'. At the lower portions 14, 14', a platform 16 is connected pivotably about the pivot axis 18 to the support pillars 10, 10' by means of a shaft 19. Side plates 20, 20' are arranged at each of the lateral edges on the platform 16, wherein a stamping 21 (shown only in relation to one side plate 20[1]) is provided along the longitudinal axis 11. A handle 22 is also arranged on the support pillar 10 so that a wheelchair user being transported by means of the vehicle lift 1 can hold that handle 22 during transport.

The support pillars 10, 10' are in one piece and of a curved configuration along their longitudinal axes 11 in the upper portions 12, 12', as is also described in greater detail hereinafter. The support pillars 10, 10' are in the form of an aluminum profile member of a substantially U-shaped cross-section.

Figure 2:
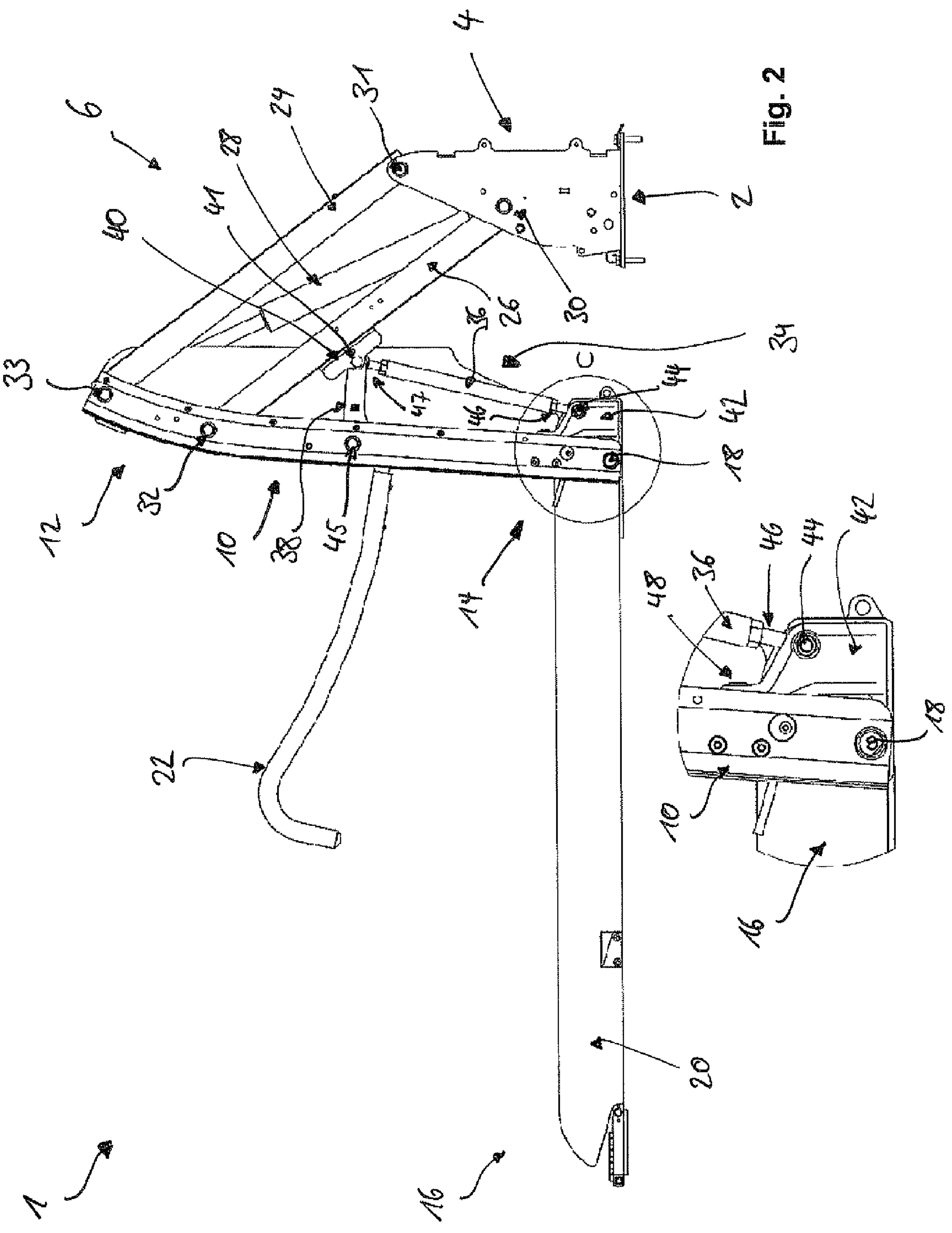
FIG. 2 is a side view of the vehicle lift in the intermediate position.

As shown in FIG. 2, the lifting devices 6, 6' are in the form of parallelogram linkages. They have a first support arm 24 and a second support arm 26 arranged parallel to each other. Both support arms 24, 26 are hingedly connected to the stand 4 and also to the support pillar 10 by means of the pivot points 30, 31, 32, 33. All pivot points 30, 31, 32, 33 are in the form of plug-in pin connections. Bushings (not shown) are also arranged in the support pillar 10 at the pivot points 32, 33 within bores on the support pillar 10 to reduce wear at the support pillar 10.

The two support arms 24, 26 are equal in length and are of substantially identical configuration. The pivot points 30, 31 on the stand 4 are selected such that the support arms 24, 26 forming the parallelogram can be moved into a first retracted position and a second extended position (not shown). In the first retracted position, the two support arms 24, 26 are arranged substantially perpendicularly (see FIG. 4). In the second extended position (not shown), the support arms 24, 26 are arranged substantially horizontally. Moreover, the pivot points 32, 33 on the support pillar 10 are suitably arranged in displaced relationship in order to permit the parallelogram of the lifting device 6. The upper portion 12 of the support pillar 10 is of a curved configuration such that the displacement between the pivot points 32, 33 is compensated. The lower portion 14 of the support pillar 10 is substantially straight to permit a compact structure which also saves on weight.

A hydraulic cylinder 28 is provided for actuating the lifting device 6. The hydraulic cylinder 28 is arranged diagonally in the parallelogram formed by the support arms 24, 26. For the purpose of actuating the hydraulic cylinder 28, the hydraulic cylinder 28 is connected, on the one hand, to the pivot point 30 and on the other hand to the pivot point 33. Upon extension of the hydraulic cylinder 28, the vehicle lift is accordingly moved into the first retracted position, and, correspondingly upon retraction of the hydraulic cylinder 28, it is moved into the second extended position as is readily apparent in FIG. 2.

A mechanism 34 for pivoting the platform 16 is also arranged on the vehicle lift 1. The mechanism 34 has a first leg 38 which is pivotably attached to the support pillar 10 and a second leg 36 connected to the first leg 38 by means of a joint 40, more specifically elbow joint 40. A slide shoe 41 is further arranged at the elbow joint 40. The other end of the second leg 36 co-operates with the platform 16. For that purpose, arranged on the platform 16 is a support 42 for supporting moments in relation to the support pillar 10. The support 42 is engaged by the second leg 36 by being hingedly connected thereto by means of a second joint 44.

The corresponding joint portions 46, 47 of the second leg 36, which is in the form of a thrust rod, are displaceably fixed relative to each other. As is readily apparent from FIG. 2, the slide shoe 41 comes into contact with the second support arm 26 when the vehicle lift 1 is moved into the first retracted position. In that case, a force acts by way of the second leg 36 on the support 42 and, thus, on the platform 16 in such a way that it is pivoted into the vertical about the pivot axis 18. In contrast, upon extension of the vehicle lift 1, the slide shoe 41 loses contact with the second support arm 26 as from a given extension point (for example as from the intermediate position as shown in FIG. 2). In order then to prevent further lowering movement of the platform 16, an arm-shaped projection 48 is arranged on the support 42. This arrangement serves as an abutment which limits pivotal movement of the platform 16 relative to the support pillar 10 by the projection 48 coming into contact with a reinforcing profile member 50, as can be more clearly seen in FIG. 3. A screw 49 is arranged on the projection 48, which serves as an adjustable abutment. That makes it possible to adjust the pivotal angle, from which the pivotal movement of the platform 16 relative to the support pillar 10 is limited. For that purpose, the reinforcing profile member 50 is screwed to the support pillar 10 by means of two screw connections 51, 52. The shaft 19 defining the pivot axis 18 is also received in the reinforcing profile member 50 and is fixedly clamped therein with a clamping means 54. For that purpose, the shaft 19 has a flattened region so that the reinforcing profile member can engage it in a positively locking relationship.

Figure 3:
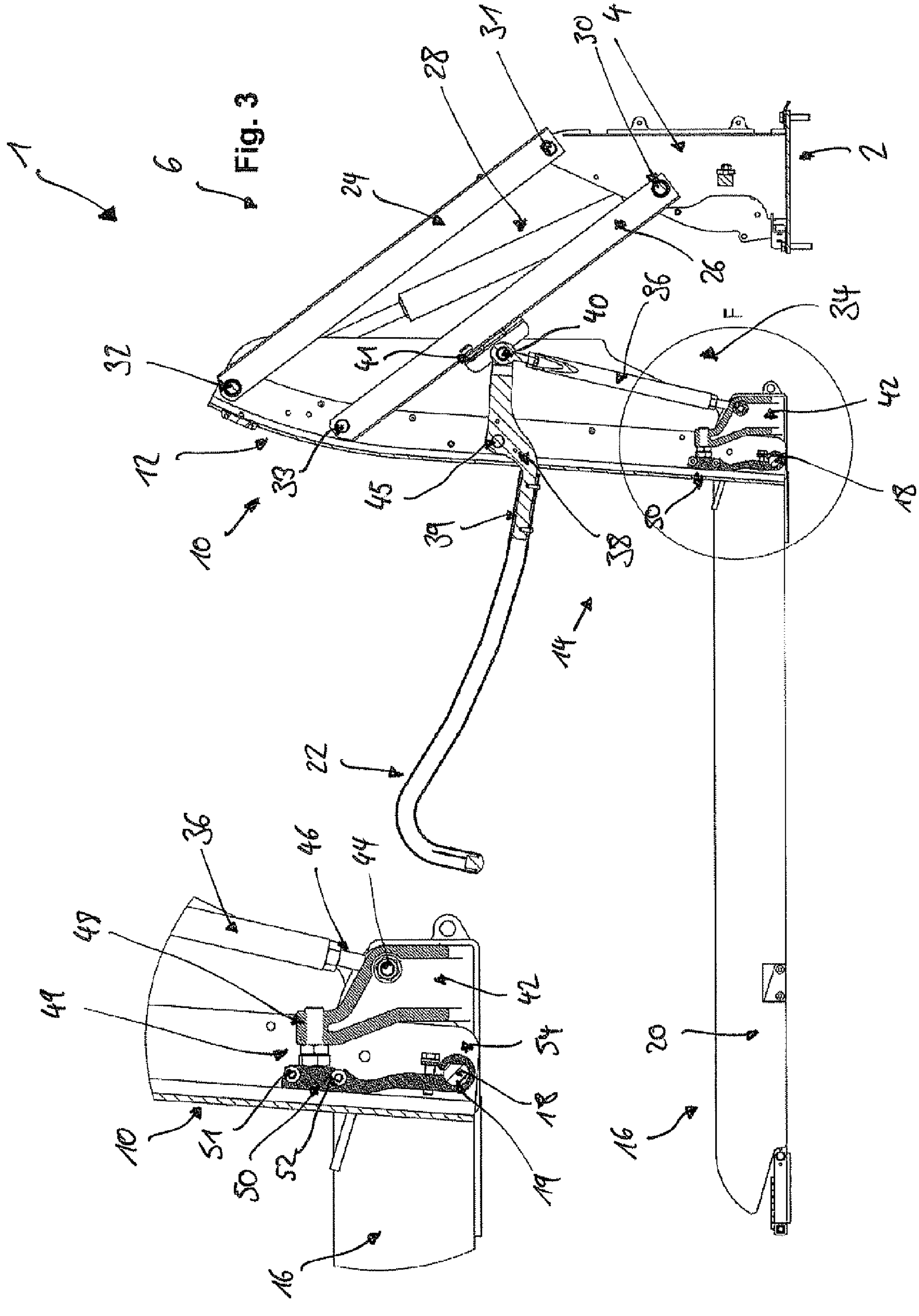
FIG. 3 is a cross-sectional view through the vehicle lift in the intermediate position.

As can be seen in particular from FIG. 3, the first leg 38 of the mechanism 34 extends through the support pillar 10 and beyond a pivotal mounting 45. The handle 22 is fixed to that portion 39 which extends beyond the support pillar 10. Thus, in the movement from the first retracted into the second extended position or from the second extended position into the first retracted position of the vehicle lift 1, the handle 22 is automatically movable therewith and is disposed in a vertically, upwardly pivoted condition in the first retracted position. Because the handle 22 is of the curved shape shown in FIG. 3, the handle 22 fits substantially to the curved portion 12 of the support pillar 10 so that the vehicle lift 1 is particularly compact.

Figure 4:
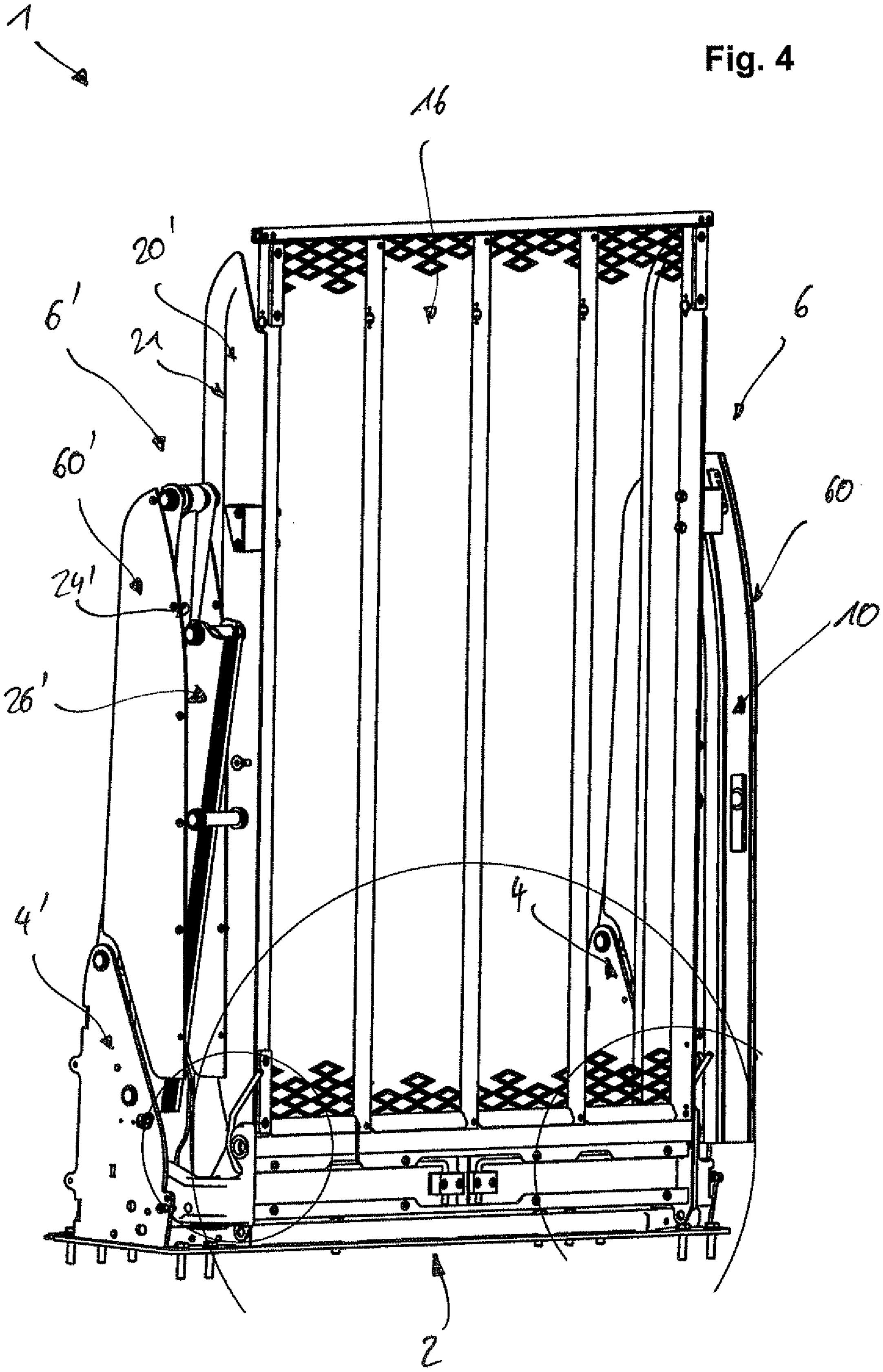
FIG. 4 is a perspective view of the vehicle lift in the first retracted position.
Figure 5:
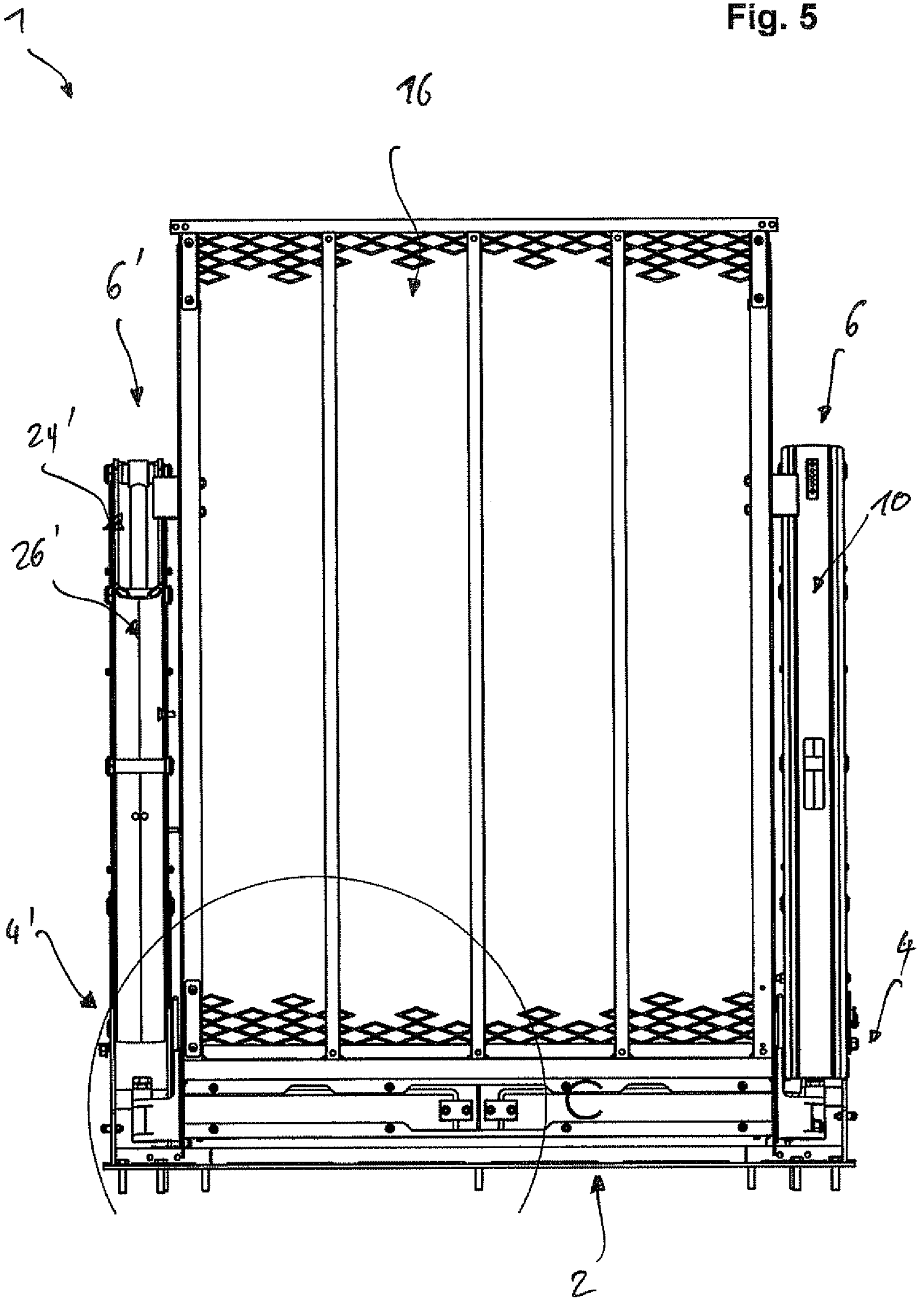
FIG. 5 is a front view of the vehicle lift in the first retracted position.

In FIG. 4 illustrating the first retracted position of the vehicle lift 1, side plates 60, 60[1], are arranged laterally on the lifting device 6. That serves on the one hand to reduce the risk of injury insofar as it prevents, for example, operators from trapping fingers between the support arms 24, 26. On the other hand the side plate 60, 60' has visual, aesthetic functions. For illustration purposes, the support pillar 10' which is at the left in relation to FIG. 4 is omitted from FIGS. 4 and 5 so that the support arms 24', 26' are visible. Thus, only the right-hand support pillar 10 is illustrated.

Figure 6:
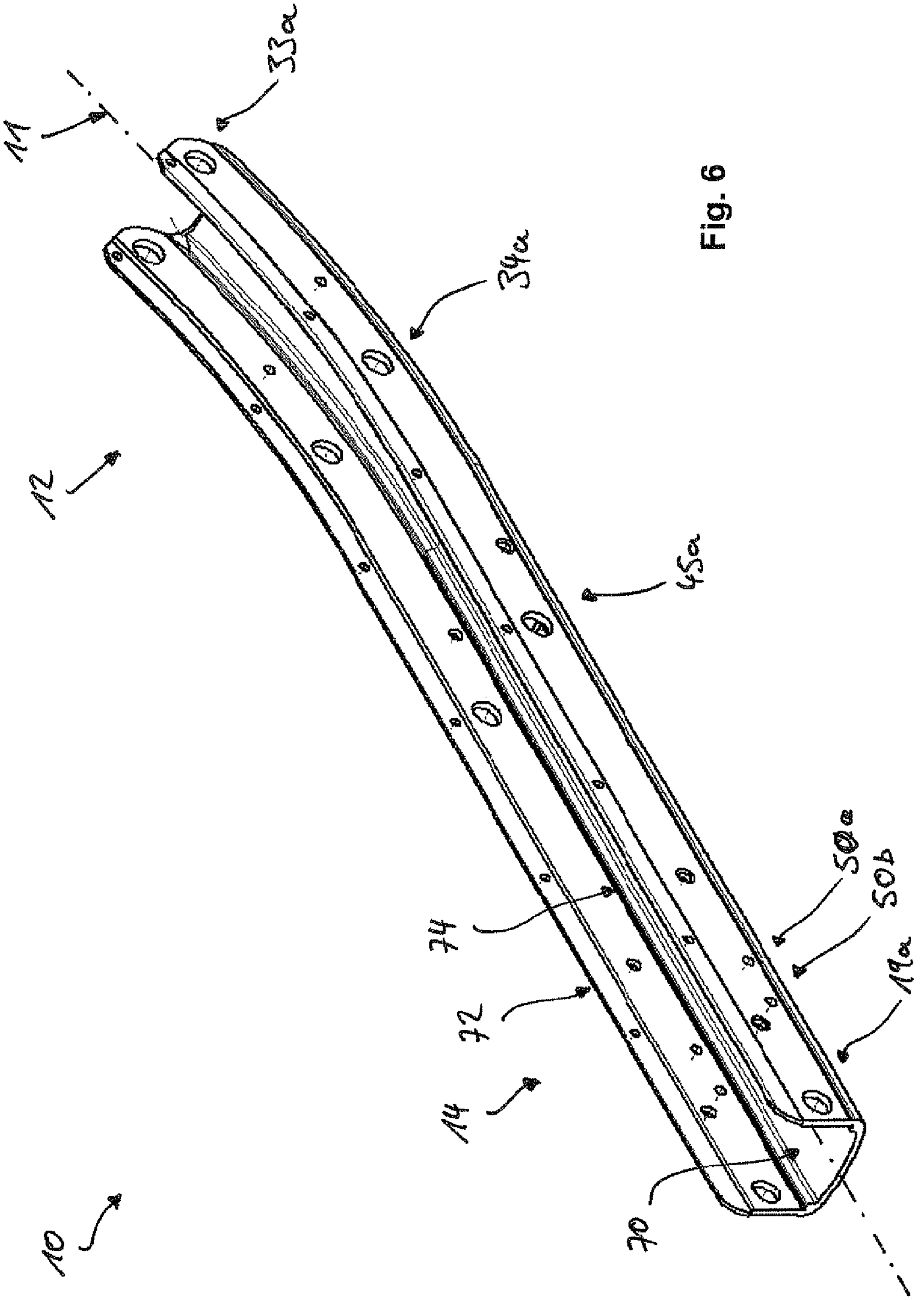
FIG. 6 is a perspective view of a support pillar.

The precise configuration of the support pillar 10 can be seen from the perspective view in FIG. 6. The support pillar 10 is of a substantially elongate basic configuration. The upper portion 12 is of a curved configuration, the lower portion 14 is straight. Overall, the support pillar 10 is in one piece. In this embodiment, it is made from anodized aluminum. As shown in FIG. 6, the support pillar 10 does not have any weld seams or other connecting locations. It is produced by an extrusion process having at least the steps of extrusion, cutting to length, and bending.

The support pillar 10 is curved along its longitudinal axis 11. The longitudinal axis 11 is accordingly of a curved configuration.

Figure 8:
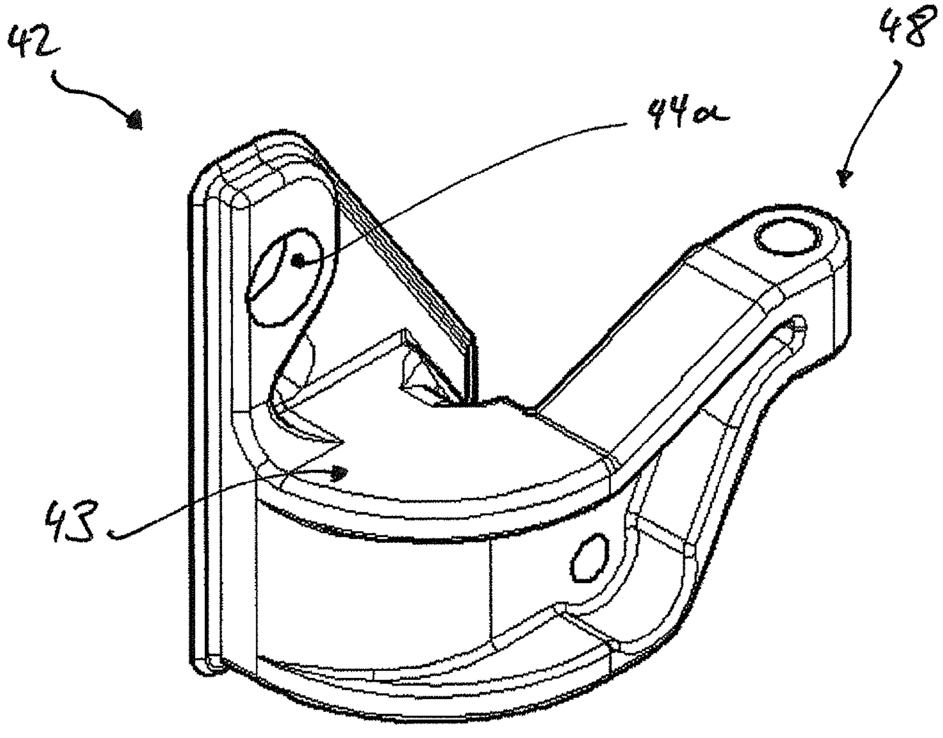
FIG. 8 is a perspective view of a support.

The support pillar 10 has a substantially U-shaped profile member. It has a back 70 and two side walls 72, 74 which are arranged substantially perpendicularly to the back 70 and parallel to each other and thus form the two legs of the U-shaped cross-section. Provided in the side walls 72, 74 are through bores 33*a*, 34*a*, 45*a* and 19*a* for receiving the hinged connections 33, 34, 45 and the pivotal shaft 19 (see FIGS. 1-5). Bushings (not shown) are fitted into the through bores 33*a*, 34*a*, 45*a*, 19*a* so that no or minimal wear occurs in operation at the aluminum support pillar 10. Further, through bores 50*a*, 50*b* are provided in the lower portion 14 for fitting the reinforcing profile member 50 (see FIG. 9). Moments of force are supported by means of the support 42 (see FIG. 8) in relation to the reinforcing profile member 50 arranged between the two side walls 72, 74 in lower portion 14.

Figure 7:
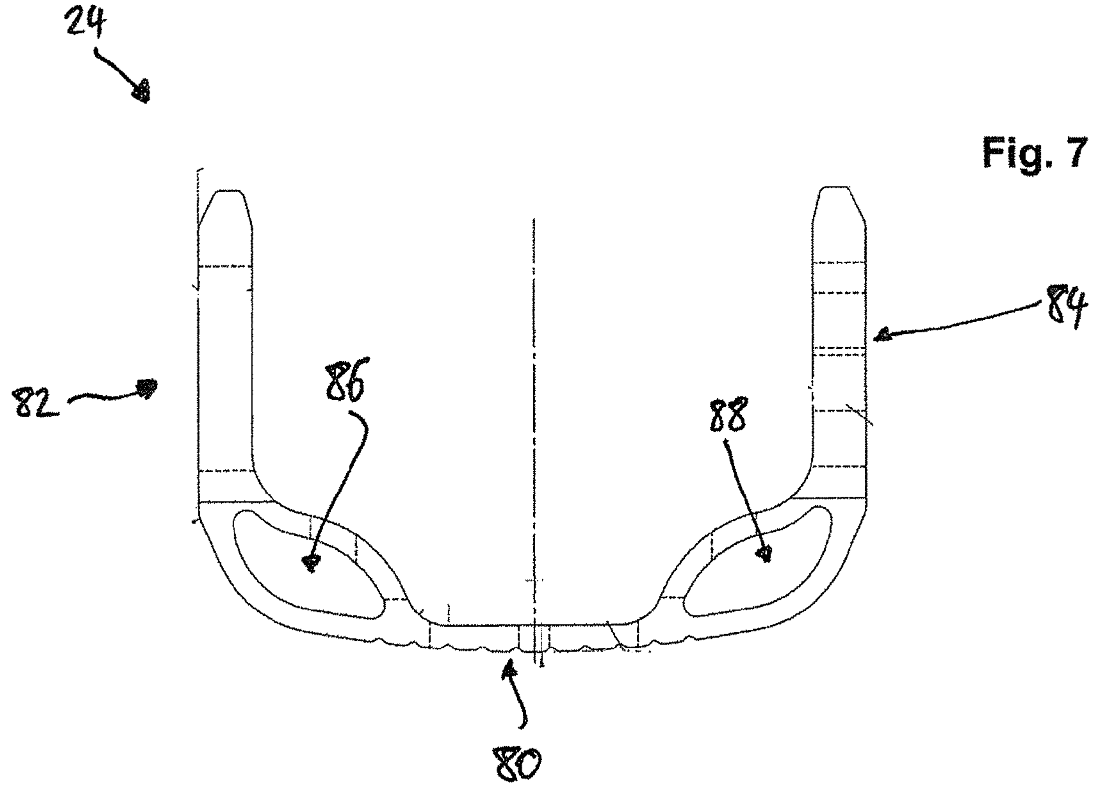
FIG. 7 is a cross-section through a support arm.

The support arms 24, 26 are also of a substantially U-shaped cross-section. By way of example, FIG. 7 shows the cross-section of the support arm 24. Like the support pillar 10, the support arm 24 has a back 80 and two side walls 82, 84 respectively substantially parallel to each other. In addition, a passage 86, 88 is respectively provided in the transitional region between each side wall 82, 84 and the back 80. The passage 86, 88 is preferably already produced upon extrusion of the support arm 24 or another production process. For example, cables can be passed through the passages 86, 88. In addition, the passages 86, 88 have a stiffening effect so that the support arms 24, 26 can better carry forces acting on the parallelogram, such as, for example the slide shoe 41 acting on the support arm 26.

The support 42 (FIG. 8) has a main body 43 and an arm-shaped projection 48 which extends therefrom and serves as an abutment 48. The support 42 can be screwed to the platform 16 by means of the main body 43. A through bore 44*a* may be provided in the main body 43 for receiving the hinged connection 44 (see FIG. 3). The support 42 is produced in the form of a free-form casting to produce an optimum configuration with respect to weight so that the weight of the vehicle lift 1 is reduced.

Figure 9:
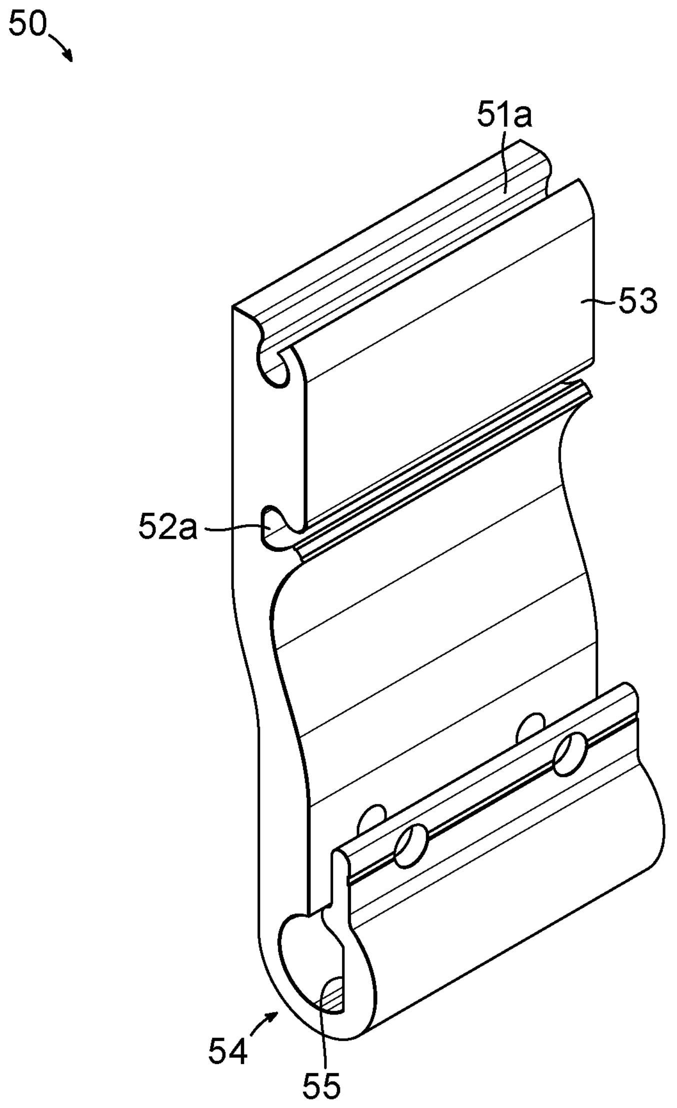
FIG. 9 is a perspective view of a reinforcing profile member.

With respect to FIG. 9, the reinforcing profile member 50 (see FIG. 9) has two through bores 51*a*, 52*a* for receiving the screwing connection 51, 52 to the support pillar 10. The through bores 51*a*, 52*a* are of a slotted configuration to facilitate assembly. A contact surface 53 is provided in the region between the those bores 51*a*, 52*a* with which the abutment 48 or the screw 49 of the support 42 can come into contact. At the other end of the reinforcing profile member 50 is the clamping means 54 for holding the shaft 19 (not shown in FIG. 9). Provided on the clamping means 54 is a flattened portion 55 which can co-operate in a positively locking relationship with a flattened portion 55 on the shaft 19 to rotationally fix the shaft 19.

The invention claimed is:

1. A vehicle lift for use with a wheelchair, comprising:

a support pillar having a longitudinal axis;

a platform pivotably connected to the support pillar and configured to support the wheelchair; and a lifting device hingedly connected to the support pillar, the lifting device configured for lifting and lowering the support pillar with the platform between a retracted position and an extended position, wherein the support pillar is formed integrally as one piece through steps including extrusion and bending, has a curved portion extending along an arcuate path relative to the longitudinal axis, the arcuate path defining a bending radius and a center of curvature, and the support pillar is comprised of aluminum, and wherein the lifting device is hingedly connected to the curved portion of the support pillar at a plurality of mounting points, the plurality of mounting points being arranged along a second arcuate path that is concentric with the arcuate path defined by the curved portion of the support pillar.

2. The vehicle lift of claim 1 wherein the support pillar lacks weld seams.

3. The vehicle lift of claim 1 wherein the curved portion is an upper portion of the support pillar.

4. The vehicle lift of claim 1 wherein the support pillar is a profile member with a cross-section of a substantially U-shaped configuration.

5. The vehicle lift of claim 1 wherein the bending radius of the curved portion of the support pillar is between 700 mm and 1000 mm.

6. The vehicle lift of claim 1 wherein the platform is pivotable about a horizontal axis, and the lifting device being adapted to move the support pillar and the platform perpendicularly relative to the pivot axis.

7. The vehicle lift of claim 1 wherein the lifting device further includes:

a parallelogram linkage pivotably connected to the support pillar;

a plurality of support arms arranged substantially parallel to each other, each support arm having at least two ends; and a vehicle-side fixing portion, wherein one end of each support arm is pivotable with respect to the support pillar and the other end of each support arm is pivotable with respect to the vehicle-side fixing portion.

8. The vehicle lift of claim 7 wherein the plurality of support arms further comprises: a passage formed in each support arm, the passage being configured for passing lines therethrough.

9. The vehicle lift of claim 1 further comprising:

a support arranged on the platform and configured to support moment forces in relation to the support pillar.

10. The vehicle lift of claim 9 further comprising:

an abutment on the support and that contacts the support pillar, the abutment configured to operably limit pivotal movement of the platform relative to the support pillar, wherein the abutment apples force to the support pillar in a direction that is substantially central with respect to the direction perpendicular to the longitudinal axis.

11. The vehicle lift of claim 10 further comprising:

a reinforcing profile member, the reinforcing profile member arranged on the support pillar to co-operate with the abutment for the support to operably limit the pivotal movement of the platform relative to the support pillar.

12. The vehicle lift of claim 9 further comprising:

a mechanism engaging the support or the platform, the mechanism is configured to pivot the platform.

13. The mechanism of claim 12 wherein the mechanism includes an elbow lever with a first leg and a second leg connected with the first leg in an elbow-hinge relationship, and the mechanism is operable to pivot the platform such that the first leg is pivoted toward the support pillar and the second leg is pivoted toward the platform.

14. The mechanism of claim 13 wherein the second leg is in the form of a thrust rod, and further comprising:

a first joint element arranged at one end of the thrust rod; and a second joint element arranged at an opposite end of the thrust rod.

15. The vehicle lift of claim 1 further comprising:

a plurality of side plates arranged on the platform.

16. The vehicle lift of claim 1, wherein the support pillar lacks an internal joint connecting a plurality of separately formed pieces of the support pillar.

17. A vehicle lift for use with a wheelchair, comprising:

a vehicle-side fixing portion having a base plate configured to be mounted to a vehicle;

a support pillar having a lower portion and a curved upper portion, the support pillar being formed integrally as one piece, having a U-shaped cross-sectional profile, and being comprised of aluminum;

a platform pivotably connected to the lower portion and configured to support the wheelchair;

a lifting device hingedly connected to the curved upper portion and configured for lifting and lowering the support pillar with the platform between a retracted position and an extended position, the lifting device including a parallelogram linkage pivotably connected to the support pillar and having a plurality of support arms arranged substantially parallel to each other, each support arm having at least two ends, wherein one end of each support arm is pivotable with respect to the support pillar and the other end of each support arm is pivotable with respect to the vehicle-side fixing portion;

and a support rigidly coupled to the platform and not connected to said vehicle-side fixing portion, the support including an abutment that engages the lower portion of the support pillar for limiting pivotal movement of the platform relative to the support pillar.

18. A vehicle lift for use with a wheelchair, comprising:

a support pillar having a longitudinal axis;

a platform pivotably connected to the support pillar and configured to support the wheelchair; and a lifting device hingedly connected to the support pillar, the lifting device configured for lifting and lowering the support pillar with the platform between a retracted position and an extended position, wherein the support pillar is formed integrally as one piece through steps including extrusion and bending, has a curved configuration at least along the longitudinal axis, and is comprised of aluminum.

19. A vehicle lift for use with a wheelchair, comprising:

a support pillar having a longitudinal axis;

a platform pivotably connected to the support pillar and configured to support the wheelchair; and a lifting device hingedly connected to the support pillar, the lifting device configured for lifting and lowering the support pillar with the platform between a retracted position and an extended position, wherein the support pillar is formed integrally as a seamless one piece through steps including extrusion and bending, has a curved portion extending along an arcuate path relative to the longitudinal axis with a bending radius of between 700 mm and 1000 mm measured at an inner edge of the support pillar, and is comprised of aluminum.

20. A vehicle lift for use with a wheelchair, comprising:

a support pillar having a longitudinal axis;

a platform pivotably connected to the support pillar and configured to support the wheelchair; and a lifting device hingedly connected to the support pillar, the lifting device configured for lifting and lowering the support pillar with the platform between a retracted position and an extended position, the lifting device being hingedly connected to a stand fixed on a bottom plate for arrangement in the vehicle, and the lifting device being in the form of a parallelogram linkage;

wherein the support pillar is formed integrally as a seamless one piece through steps including extrusion and bending, has a curved portion extending along an arcuate path relative to the longitudinal axis, and is comprised of aluminum.

* * * * *